(12) United States Patent
François et al.

(10) Patent No.: US 7,092,443 B2
(45) Date of Patent: Aug. 15, 2006

(54) PROCESS AND DEVICE FOR VIDEO CODING USING THE MPEG4 STANDARD

(75) Inventors: Edouard François, Bourg des Comptes (FR); Jean Kypreos, Betton (FR); Dominique Thoreau, Cesson Sévigné (FR)

(73) Assignee: Thomson Licensing, Boulogne-Billancourt (FR)

( * ) Notice: Subject to any disclaimer, the term of this patent is extended or adjusted under 35 U.S.C. 154(b) by 968 days.

(21) Appl. No.: 10/140,561

(22) Filed: May 7, 2002

(65) Prior Publication Data

US 2002/0181591 A1 Dec. 5, 2002

(30) Foreign Application Priority Data

May 21, 2001 (FR) .................................. 01 06648

(51) Int. Cl.
*H04N 7/12* (2006.01)
*H04N 11/02* (2006.01)

(52) U.S. Cl. .............................. 375/240.11; 375/240.15

(58) Field of Classification Search ........... 375/240.11, 375/240.15; 382/238, 239
See application file for complete search history.

(56) References Cited

U.S. PATENT DOCUMENTS

| | | | |
|---|---|---|---|
| 5,737,537 A | 4/1998 | Gardos et al. | 395/200.77 |
| 5,815,670 A | 9/1998 | Iverson et al. | 395/200.77 |
| 5,946,042 A | 8/1999 | Kato | 348/416 |
| 5,946,043 A | 8/1999 | Lee et al. | 348/420 |
| 6,097,842 A * | 8/2000 | Suzuki et al. | 382/232 |
| 6,385,345 B1 * | 5/2002 | Ribas-Corbera et al. | 382/239 |

OTHER PUBLICATIONS

AD HOC Group on MPEG-4 Video VM Editing: "MPEG-4 Video Verification Model Version 7.0—ISO/IEC JTC1/SC29/WG11 MPEG97/N1642—Appendix A: Combined Motion Shape Texture Coding", pp. 195-203, Apr. 1997.

French Search Report dated: Aug. 31, 2001.

* cited by examiner

*Primary Examiner*—Gims Philippe
*Assistant Examiner*—Erick Rekstad
(74) *Attorney, Agent, or Firm*—Joseph S. Tripoli; Ronald H. Kurdyla; Guy H. Eriksen

(57) ABSTRACT

The device is characterized in that it comprises means for preventing the "skipped macroblock" mode of coding of a macroblock of an image of P type on the basis of a correlation item measuring the correlation of this macroblock or of the co-located macroblock of the previous I or P image with the co-located macroblock of a next image of B type, in the order of coding.

7 Claims, 3 Drawing Sheets

PROCESS AND DEVICE FOR VIDEO CODING USING THE MPEG4 STANDARD

FIELD OF THE INVENTION

The invention relates to a process and device for the video coding of an image sequence.

It is more especially concerned with choosing the modes of prediction of the macroblocks (MB) of the images of P type with regard to the spatial-temporal content of the previous images of B type.

The technical field is that of video compression, the context that of algorithmic tools such as the discrete cosine transformation (DCT), quantization of the transformed coefficients, motion estimation and compensation, fixed-length and variable-length codings. The images to be coded are of intra or inter type, of P type (predictive) or B type (bidirectional predictive) in inter mode.

Hereafter, we shall refer indiscriminately to image or to VOP (Video Object Plane), a term designating, in the MPEG 4 standard, the image entity which is not necessarily rectangular. The terms "co-located macroblock" designate the macroblock situated at the same spatial position in another image.

BACKGROUND OF THE INVENTION

The choice of the mode of prediction of the macroblocks belonging to the images of B type or B images, as per the MPEG 4 standard, is highly dependent on the mode of coding adopted for the "co-located" macroblocks of the last coded predicted reference P image. The MPEG 4 standard ISO/IEC 14496-2 relating to video coding specifies, as far as motion compensation for skipped macroblocks (paragraph 7.6.9.6) is concerned, that if the co-located macroblock which is situated in the I or P video object plane (I-VOP or P-VOP) most recently decoded is skipped, the macroblock belonging to the B images is processed in the forward predictive mode ("forward prediction") with the zero motion vector.

Stated otherwise, if a macroblock of the P image is skipped, that is to say not coded, the "co-located" macroblocks belonging to the previous images of B type, in the order of display, have necessarily to be reconstructed by a specific mode of interpolation utilizing an earlier, in the order of display, reference image via zero vectors.

This concept has been worked out starting from the principle that the content of an image sequence complies with a minimum of temporal stationarity between two images of I or P types. This is true for contents which may be referred to as conventional (TV scene, cinema, videophone, videoconference). On the other hand, as soon as one is confronted with montages, video clips, footage of films endowed with special effects, this stationarity 4 is no longer complied with and an image may not bear any relation to the content of the previous image and next image. If it turns out that this isolated image is of B type, the consequence is that the macroblocks of this B image, which have their counterparts "skipped" in the last coded P image, are inevitably reconstructed with information unrelated to the initial information. Visually the result, albeit momentary, is catastrophic and is characterized by defects in the size of the macroblock.

FIG. 1 illustrates the problem which may arise with uncoded macroblocks in a P-VOP (image of P type). An image sequence consists for example of four successive images VOP 1 to VOP 4. The images VOP 1 and VOP 4 are P type images (P-VOP), the images VOP 2 and VOP 3 are B type images (B-VOP). The P-VOP most recently decoded is VOP 4. When B-VOP 3 is decoded, some of the macroblocks of P-VOP 1 are copied over as they are into B-VOP 3, insofar as the co-located macroblocks of P-VOP 4 have not been coded, these macroblocks of P-VOP 4 then being likewise a copy over of the macroblocks of P-VOP 1. Thus, a number of black macroblocks are thus seen to appear in this B-VOP.

The aim of the invention is to alleviate the aforesaid drawbacks.

SUMMARY OF THE INVENTION

Its subject is a process for the video coding of a sequence of images comprising images of I, P and B type, a group of images of B type being bounded by a previous image of I or P type for the lower bound and a next image of P type for the upper bound when considering the display order, such coding implementing the "skipped macroblock" coding mode which, if the co-located macroblock which is situated in the I or P image most recently coded is skipped, forces the coding of the macroblock belonging to the next B images to be coded in the forward predictive mode ("forward prediction") with the zero motion vector, characterized in that it comprises:

a calculation of a correlation level allocated to a block or a macroblock of an image of B type defining its correlation with the co-located block or macroblock of either of the images bounding the images of B type, a comparison of the level with a predetermined threshold, a barring of the "skipped macroblock" mode of coding of a block or macroblock of an image of P type of the upper bound, if the correlation level allocated to the co-located block or macroblock of an image of B type is less than the threshold.

According to a particular embodiment, the process is characterized in that it comprises, for the coding of a macroblock of an image of P type corresponding to the upper bound, a step of preceding, determining whether the coding is compatible with the "skipped macroblock" mode, if so, a step of calculating a correlation level for the co-located macroblock of each of the images of B type, a step of comparing the levels obtained with a predetermined threshold, a step of coding the current macroblock either in "skipped macroblock" mode if the level is greater than the predefined threshold for each of the macroblocks of the images of B type, or in coding mode with zero motion vector in the converse case.

According to a particular embodiment, the correlation level is calculated on the basis of a parameter SAD:

$$SAD_{cur} = \left( \sum_{i,j=0}^{i,j=15} |B_{cur}(i,j) - IP_{prev}(i,j)| \right),$$

with i, j: row and column indices of the pixels contained in the macroblock, cur: indices of the type B images situated between the two I or P and P images, $B_{cur}$: current type B image with regard to which the difference measurement is performed, IP$_{prev}$: previous, in the order of display, image of I or P type, SAD$_{cur}$: sum of the absolute value of the differences.

According to a particular embodiment, the correlation level is calculated on the basis of a parameter SAD:

$$SAD_{cur} = \left( \sum_{i,j=0}^{i,j=15} |B_{cur}(i, j) - P_{next}(i, j)| \right),$$

with i, j: row and column indices of the pixels contained in the macroblock, cur: indices of the type B images situated between the two I or P and P images, B$_{cur}$: current type B image with regard to which the difference measurement is performed, P$_{next}$: next, in the order of display, image of P type, SAD$_{cur}$: sum of the absolute value of the differences According to a particular embodiment, one or the other of the images bounding the images of B type on the basis of which the correlation level is calculated is the local decoded image of I or P type preceding the group of images of B type or the local decoded image of P type following the group of images of B type, in the order of display.

The subject of the invention is also a coding device using the MPEG 4 standard for the coding of a sequence of images, characterized in that it comprises means for preventing the "skipped macroblock" mode of coding of a macroblock of an image of P type on the basis of a correlation item measuring the correlation of this macroblock or of the co-located macroblock of the previous I or P image with the co-located macroblock of a next image of B type, in the order of coding.

The main advantage of the present invention is that it avoids display defects consisting in the appearance of defective macroblocks under specific conditions of image coding.

The quality of restitution of the decoded images is thereby improved.

BRIEF DESCRIPTION OF THE DRAWINGS

Other features and advantages of the invention will become clearly apparent in the following description given by way of non-limiting example and with regard to the appended figures which represent.

DETAILED DESCRIPTION OF PREFERRED EMBODIMENTS

Figure 1:
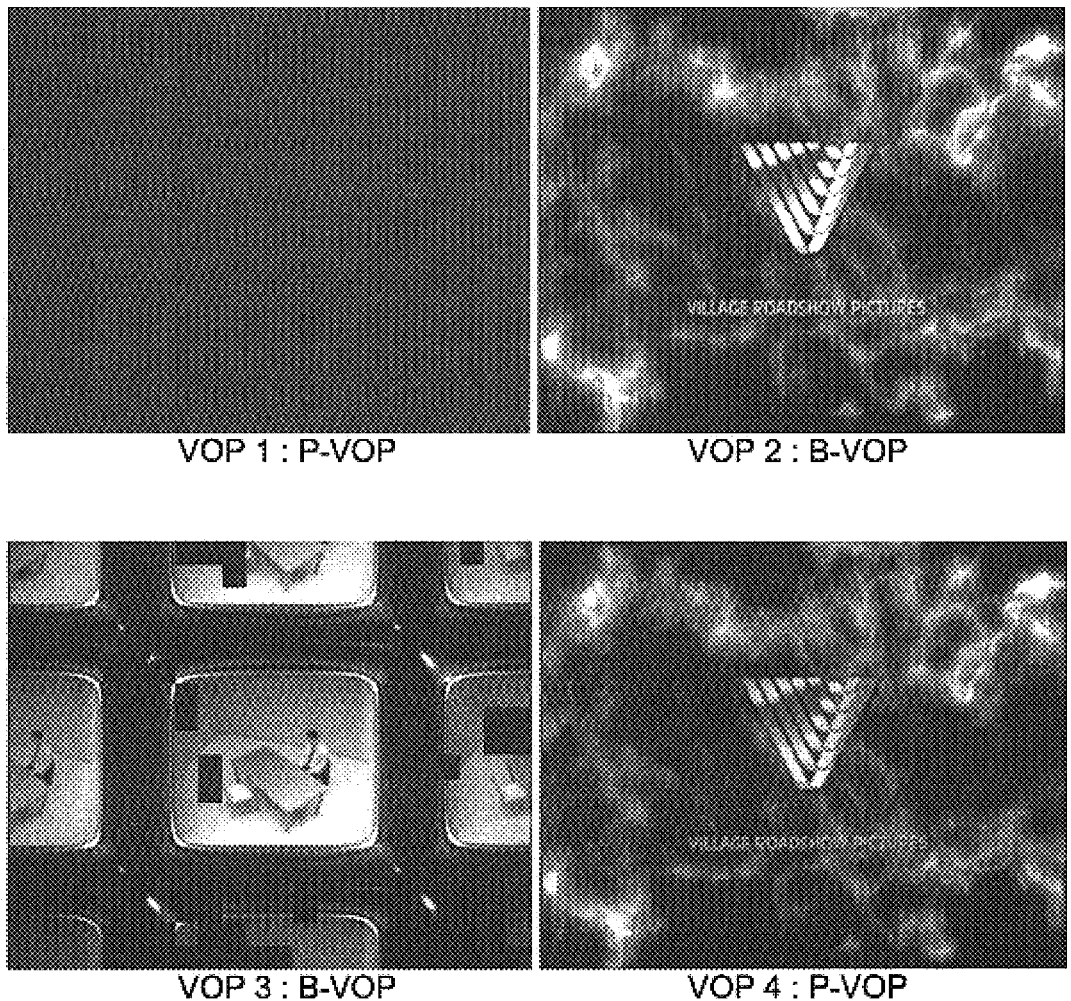
FIG. 1, a succession of four images of an image sequence exhibiting display defects, FIG. 2, the order of decoding and of display of the various types of images, FIG. 3, the decoding of a current macroblock, FIG. 4, a simplified flow chart of the coding process.
Figure 2:
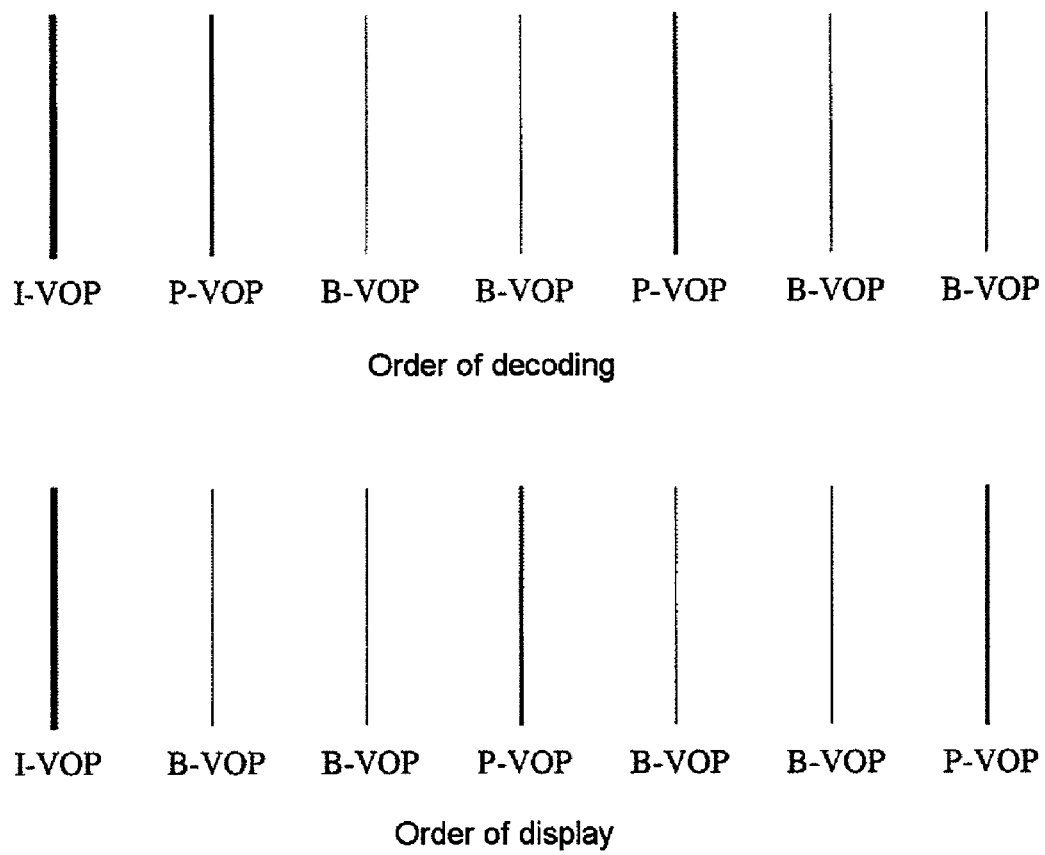

FIG. 2 represents, in the upper part, a succession of images or planes VOP in their order of decoding and hence coding, and, in the lower part, a succession of images in their order of display. It will be noted that the most recently decoded P-VOP (P type object plane) is displayed after the B-VOPs referring thereto.

Figure 3:
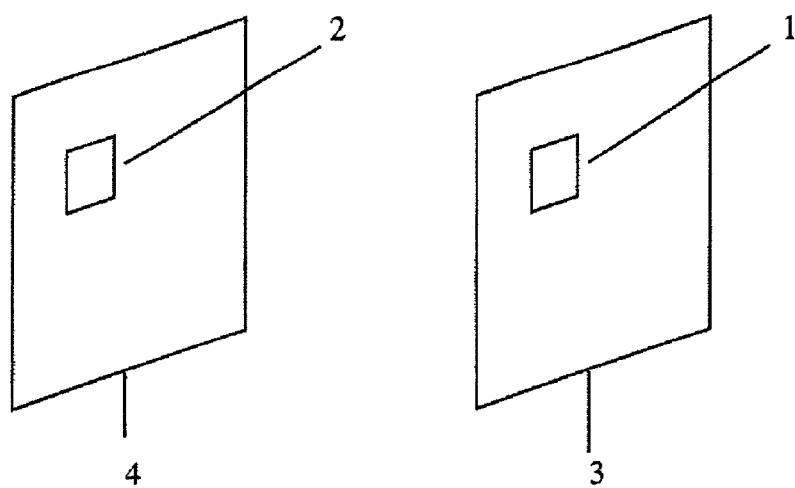

FIG. 3 represents, diagrammatically, the decoding of a current macroblock 1 of a B-VOP referenced 3. This decoding takes account of the co-located macroblock 2 of the P-VOP referenced 4 previously decoded. If the co-located macroblock 2 is uncoded ("skipped macroblock" mode), macroblock 1 is constructed by simple "forward" prediction of the co-located macroblock, that is to say a simple copying over of this co-located macroblock. The image referenced 3 corresponds for example to the $3^{rd}$ image of the image chain represented in the upper part of FIG. 2, the image referenced 4 corresponds to the $2^{nd}$ image, the forward prediction then coming from the first image, i.e. the I-VOP in this example.

The idea of the invention is to render the choice of the mode of coding of the macroblocks belonging to the P type images conditional, so as to remove the defects of restitution in the B type images. In fact, one verifies whether the intermediate images of B type are temporally correlated with one or both extreme images flanking them.

When at the level of a P image, a macroblock is a candidate for the "skipped macroblock" mode, the sum, called SAD, of the absolute value of the differences between this co-located macroblock and the counterpart macroblock of the previous, in the order of display, I or P image is calculated over the co-located macroblock of each of the previous, in the order of display or temporal order, images B.

$$SAD_{cur} = \left( \sum_{i,j=0}^{i,j=15} |B_{cur}(i, j) - IP_{prev}(i, j)| \right),$$

with i, j: row and column indices of the pixels contained in the macroblock, cur: indices of the type B images situated between the two I or P and P images, B$_{cur}$: current type B image with regard to which the difference measurement is performed, IP$_{prev}$: previous image of I or P type (in the order of display)

SAD$_{cur}$: sum of the absolute value of the differences.

If among the differences SAD$_{cur}$ corresponding to the macroblocks of the B images, at least one of them exceeds a given threshold, thus manifesting an insufficient level of correlation, the macroblock of the P image to be coded, a candidate for the "skipped macroblock" mode, is forced into "coding" mode, that is to say its vectors are coded, its content from the point of view of the DCT coefficients likewise. This macroblock is generally empty on account of the correlation having generated this possibility of coding in "skipped macroblock" mode, in particular if the quantization interval remains unchanged.

In the converse case, that is to say when all the values SAD$_{cur}$ are less than or equal to the threshold, manifesting a correlation of the macroblocks, the macroblock of the P image is confirmed in the "skipped macroblock" mode.

By forcing the coding of the macroblock of the P image, that is to say by forcing it not to be "skipped", the macroblocks of the B images are likewise forced into coding mode and hence not "skipped". The coding takes into account the actual content of these macroblocks, thus avoiding the display defects.

The calculation of the sum SAD is of course one exemplary embodiment and any parameter defining a level of correlation between blocks or macroblocks of images, that is to say the variation in the content of the block or macroblock from one image to another, can be used here without departing from the field of the invention.

The calculation of the sums SAD of the macroblocks can take account of a source image or a reconstructed image. It may be performed, for example, between:

the B images and the previous, in the order of display, source I or P image, the B images and the local decoded I or P image of the previous, in the order of display, source I or P image, the B images and the local decoded P image of the next, in the order of display, source P image, that is to say the previous decoded one, the B images and the next, in the order of display, source P image.

The evaluation of the correlation level allocated to a macroblock of a B image can in fact be performed either between this macroblock and the co-located macroblock of the previous I or P image, or between this macroblock and the co-located macroblock of the next P image, considered in the order of display. In the latter case, the formula for calculating SAD is the same except that $IP_{prev}$ is replaced by $P_{next}$, which corresponds to the next image of P type, again in the order of display.

The calculation of the sum of the differences can be performed in ways other than by computing the sum of the absolute value of the differences.

It is thus equally conceivable to compute:

the sum of the squares of the differences, the sum of the 4 maximum errors found in each of the four 8*8 blocks making up the macroblock.

The examples are of course not limiting.

The criterion for deciding on the mode of coding for the coding of a macroblock of a P type image therefore takes account of the previous images of B type, in the order of display. This involves all the previous images of B type lying between two images of P type or between an image of I type and an image of P type.

The threshold with which the correlation level is compared can be determined as a function of the quantization intervals used for the coding of the image blocks or macroblocks.

It is thus possible to increase the number of barrings of the "skipped macroblock" mode as a function of a quantization interval, for example the average quantization interval over the image. The fact that the quantization interval is small indicates indeed that the coder is not at the coding limit (buffer memory not saturated, etc.) and it is then less necessary to reduce the coding cost and hence to use the "skipped macroblock" mode. Likewise, the use of large quantization intervals reduces the correlation between blocks, on account of the resolution in the coding of the coefficients, and the threshold can therefore be reduced for larger quantization intervals, thus requiring less correlation to trigger the "skipped macroblock" mode.

Figure 4:
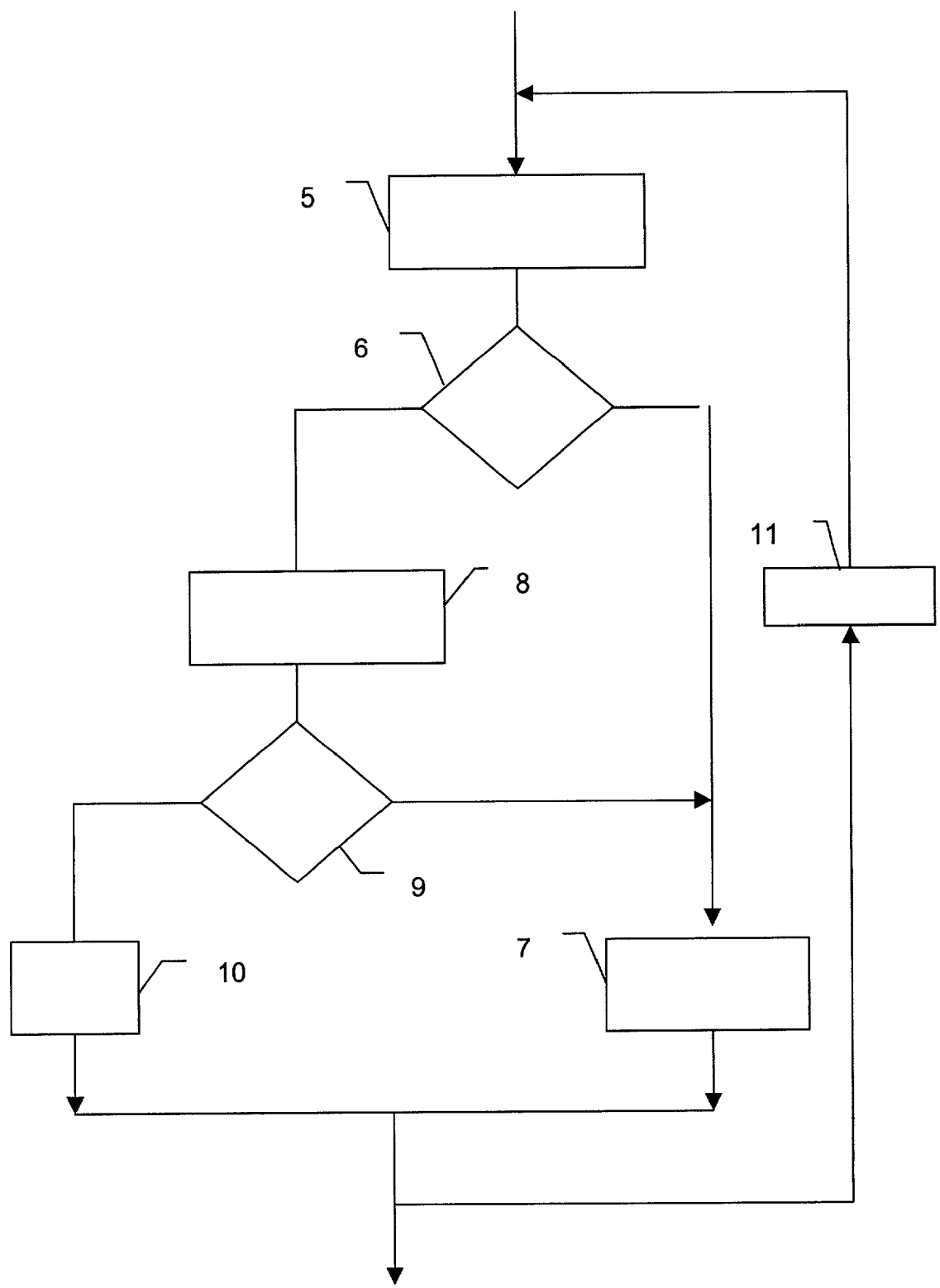

FIG. 4 represents a simplified flow chart of the coding process for determining the coding choices.

Step 5 receives a macroblock of index i of the image to be coded. The next step 6 calculates the possible mode of coding for this macroblock, in particular if it can be coded according to the "skipped macroblock" mode and takes into account the type of image to which it belongs. If it is an image other than a P image or if, in the case of a P type image, the "skipped macroblock" mode is not possible for the coding, then the next step is step 7 which performs a conventional coding of the macroblock according to the standard.

If it is a P type image and if the "skipped macroblock" mode is adopted, then the next step is step 8. This steps performs a calculation of the value SAD between the co-located macroblock of the previous image, in the order of display, of I or P type and the co-located macroblock of each of the previous images, in the order of display, of B type. If the values obtained are less than a predetermined threshold, a test performed during the next step 9, the "skipped macroblock" coding is actually performed in accordance with the MPEG 4 standard, during step 7. If at least one of the values SAD is greater than this threshold, the next step is step 10 which performs the coding of the macroblock according to the mode of coding with zero motion vector.

The macroblock of index i coded according to step 7 or 10 is transmitted to a next processing step while the index i is incremented by 1, step 11, for the coding of the next macroblock of the image.

The invention also relates to any type of coder of MPEG4 type or device utilizing a processing circuit or a means implementing an algorithm as described previously.

The applications of the present invention relate for example to the transmission of digital images utilizing the MPEG 4 video coding standard.

What is claimed is:

1. Process for the video coding of a sequence of images comprising images of I, P and B type, a group of images of B type being bounded by a previous image of I or P type for the lower bound and a next image of P type for the upper bound when considering the display order, such coding implementing the "skipped macroblock" coding mode which, if the co-located macroblock which is situated in the I or P image most recently coded is skipped, forces the coding of the macroblock belonging to the next B images to be coded in the forward predictive mode ("forward prediction") with the zero motion vector, characterized in that it comprises:

a calculation of a correlation level (8) allocated to a block or a macroblock of an image of B type defining its correlation with the co-located block or macroblock of either of the images bounding the images of B type, a comparison (9) of the level with a predetermined threshold, a barring of the "skipped macroblock" mode of coding (10) of a block or macroblock of an image of P type of the upper bound, if the correlation level (8) allocated to the co-located block or macroblock of an image of B type is less than the threshold (9).

2. Process according to claim 1, characterized in that it comprises, for the coding of a macroblock of an image of P type corresponding to the upper bound, a step of preceding, determining whether the coding is compatible with the "skipped macroblock" mode, if so, a step of calculating a correlation level (8) for the co-located macroblock of each of the images of B type, a step of comparing (9) the levels obtained with a predetermined threshold, a step of coding the current macroblock (7, 10) either in "skipped macroblock" mode if the level is greater than the predefined threshold for each of the macroblocks of the images of B type, or in coding mode with zero motion vector in the converse case.

3. Process according to claim 1 or 2, characterized in that the correlation level is calculated on the basis of a parameter SAD:

$$SAD_{cur} = \left( \sum_{i,j=0}^{i,j=15} |B_{cur}(i,j) - IP_{prev}(i,j)| \right),$$

with i, j: row and column indices of the pixels contained in the macroblock, cur: indices of the type B images situated between the two I or P and P images, $B_{cur}$: current type B image with regard to which the difference measurement is performed, $IP_{prev}$: previous, in the order of display, image of I or P type, $SAD_{cur}$: sum of the absolute value of the differences.

4. Process according to claim 1 or 2, characterized in that the correlation level is calculated on the basis of a parameter SAD:

$$SAD_{cur} = \left( \sum_{i,j=0}^{i,j=15} |B_{cur}(i,j) - P_{next}(i,j)| \right),$$

with i, j: row and column indices of the pixels contained in the macroblock, cur: indices of the type B images situated between the two I or P and P images, $B_{cur}$: current type B image with regard to which the difference measurement is performed, $P_{next}$: next, in the order of display, image of P type, $SAD_{cur}$: sum of the absolute value of the differences.

5. Process according to claim 1, characterized in that one or the other of the images bounding the images of B type on the basis of which the correlation level is calculated is the local decoded image of I or P type preceding the group of images of B type or the local decoded image of P type following the group of images of B type, in the order of display.

6. Process according to claim 1, characterized in that the threshold is predetermined as a function of the interval of quantization of a block or macroblock or of the average interval of quantization of an image.

7. Coding device using the MPEG 4 standard for the coding of a sequence of images, characterized in that it comprises means for preventing the "skipped macroblock" mode of coding of a macroblock of an image of P type on the basis of a correlation item measuring the correlation of this macroblock or of the co-located macroblock of the previous I or P image with the co-located macroblock of a next image of B type, in the order of coding.

* * * * *